United States Patent
Goeschel et al.

(10) Patent No.: US 9,448,563 B2
(45) Date of Patent: Sep. 20, 2016

(54) GREY WATER INTERFACE FOR HIGH FLOW APPLICATIONS IN VACUUM SYSTEMS

(71) Applicant: MAG Aerospace Industries, LLC, Carson, CA (US)

(72) Inventors: Christoph Goeschel, Seattle, WA (US); Nguyen Tram, Chino Hills, CA (US); Katherine Venegas, Placentia, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 336 days.

(21) Appl. No.: 14/284,726

(22) Filed: May 22, 2014

(65) Prior Publication Data

US 2014/0345695 A1 Nov. 27, 2014

Related U.S. Application Data

(60) Provisional application No. 61/826,132, filed on May 22, 2013.

(51) Int. Cl.
| | | |
|---|---|---|
| *E03D 1/00* | (2006.01) | |
| *G05D 7/06* | (2006.01) | |
| *E03C 1/242* | (2006.01) | |
| *B64D 11/02* | (2006.01) | |

(52) U.S. Cl.
CPC ............ *G05D 7/0641* (2013.01); *B64D 11/02* (2013.01); *E03C 1/242* (2013.01); *Y10T 137/0318* (2015.04); *Y10T 137/86405* (2015.04)

(58) Field of Classification Search
CPC ..... G05D 7/0641; B64D 11/02; E03C 1/242; B61D 35/007
USPC ............................................................ 4/323
See application file for complete search history.

(56) References Cited

U.S. PATENT DOCUMENTS

| | | | |
|---|---|---|---|
| 4,550,453 A | * | 11/1985 | Norman .................... E03D 5/00 4/323 |
| 6,904,926 B2 | | 6/2005 | Aylward |
| 7,533,426 B2 | | 5/2009 | Pondelick |

FOREIGN PATENT DOCUMENTS

EP 1243711 A2 9/2002

OTHER PUBLICATIONS

International Patent Application No. PCT/US2014/039095, International Preliminary Examination Report dated Dec. 3, 2015.
International Patent Application No. PCT/US2014/039095, International Search Report and Written Opinion dated Oct. 8, 2014, 9 pages.

\* cited by examiner

*Primary Examiner* — Tuan N Nguyen
(74) *Attorney, Agent, or Firm* — Kilpatrick Townsend & Stockton LLP; Dean W. Russell; Kristin M. Crall

(57) ABSTRACT

Embodiments of the present invention relate generally to a flow control unit for controlling liquid flow in a vacuum waste system. In one embodiment, the flow control unit provides a series of valves that direct liquid flow. The unit may also have an intermediate transfer tube that holds a portion of the liquid to be directed, prior to delivery of the liquid to left and right transfer tubes. In one embodiment, the unit may be installed on board a passenger transport vehicle. A particularly beneficial use of the flow control unit is on a private aircraft for use as a shower control unit.

19 Claims, 7 Drawing Sheets

GREY WATER INTERFACE FOR HIGH FLOW APPLICATIONS IN VACUUM SYSTEMS

CROSS REFERENCE TO RELATED APPLICATIONS

This application claims the benefit of U.S. Provisional Application Ser. No. 61/826,132, filed May 22, 2013, titled "Grey Water Interface for High Flow Applications in Vacuum Waste Systems," the entire contents of which are hereby incorporated by reference.

FIELD OF THE DISCLOSURE

Embodiments of the present disclosure relate generally to a flow control unit for controlling liquid flow into a vacuum waste system. In one embodiment, the flow control unit provides a series of valves that direct liquid flow. The unit may also have an intermediate transfer tube that holds a portion of the liquid to be directed, prior to delivery of the liquid to left and right transfer tubes. In one embodiment, the unit may be installed on board a passenger transport vehicle. A particularly beneficial use of the flow control unit is on a private aircraft for use as a shower drain control unit.

BACKGROUND

Certain passenger services in passenger transport vehicles (such as aircraft, ships, buses, trains, and any other passenger transport vehicles) cause waste water to accrue. This may occur from food service, hand washing, or from showers that may be provided on-board private or luxury aircraft or other vehicles. Waste water from these services is often referred to as grey water, which is "spent" or "used" water that drains from drinking water systems, from wash basins during hand washing, material poured down a galley sink, a shower drain, or any other instance in which water is soiled or loaded with waste (e.g., soaps, detergents, soils from washing). Grey water typically does not include contaminants such as septic wastes (water containing septic waste is generally referred to as "black water").

Most large passenger transport vehicles are equipped with a grey water system, which can collect and store grey water, as well as waste tanks that collect and store black water for eventual disposal. (In the absence of special valves, such as those described by U.S. Pat. No. 7,533,426 titled "Grey Water Interface Valve Systems and Methods," health standard guidelines for airlines have required that septic water ("black water") be vacuumed away separately from grey water because, if a back-up were to occur, sewage would be expelled from galley and lavatory sinks, as well as toilets, which could create a myriad of health problems.) Accordingly, the added expense of keeping grey and black water separate has generally been necessary. However, smaller vehicles may not have a separate grey water tank and may discharge grey water to the atmosphere via a drain mast.

However, if grey water is disposed outside the aircraft, it should be heated because aircraft travel at such high altitudes and where the air is so cold, that discharging grey water at room temperature may cause it to freeze immediately. Accordingly, drain masts may be provided that heat grey water prior to its discharge. This uses extra energy, adds to maintenance issues (e.g., clogs often form and need to be removed), and can cause safety problems on the ground if the drain masts are not turned off (e.g., extremely hot liquids can be discharged from a plane on the ground and scald a worker standing below the plane). Another problem with drain masts is that they create drag against the vehicle skin. This can be a particular concern on an aircraft, where drag can lower fuel efficiency and create higher operation costs.

Additionally, some airports will not allow grey water to be deposited on their tarmacs, causing airlines to find alternate solutions to outside disposal. Depositing wastes outside an aircraft that are contaminated with detergent and other soils can also be an environmental hazard. Additionally, disposing grey water outside the aircraft during travel may cause the material to "paint" the side of the plane, creating a soiled, unsightly streak alongside the body of the aircraft. This adds to maintenance and cleaning costs and could tarnish an airline's reputation for being professional and well-maintained. Accordingly, alternate solutions for disposing or storing of grey water are needed.

Most passenger aircraft have a vacuum disposal system that applies vacuum to transport waste water from toilets and/or sinks into an on-board waste water storage tank. The vacuum is generated either by the pressure differential between the pressurized cabin and the reduced pressure outside of an aircraft at high flight altitudes or by a vacuum generator at ground level or at low flight altitudes.

Currently, many luxury and private aircraft are equipped with showers. These showers can create a large volume of grey water—more than that created from typical galley and lavatory sinks. Galley and lavatory sinks are generally connected to small diameter drain lines (which can easily back up if clogged or if a high flow is introduced) and terminate at the aircraft drain mast for exhaustion to the atmosphere, but disposing of many gallons of shower water can create unsolved problems.

Another concern with moving water through an aircraft (or other vehicle with a vacuum waste system) is that existing vacuum designs can be quite loud. A flushing sound is created when the flush valve opens (e.g., the toilet flush valve). On an aircraft, differential pressure is typically what forcefully draws waste and water material down the drain. (Although on land or on other vehicles, a vacuum generator may be used to generate vacuum.)

Accordingly, it is desirable to provide a flow control unit or system that can manage the transport of grey water within passenger transport vehicles, such as aircraft. It is desirable for such a system to conduct this transport in a discrete, relatively quiet, and environmentally friendly manner. It is also desirable to provide a system and method for storing grey water in the black water (or septic) tanks that are on-board an aircraft.

BRIEF SUMMARY

Embodiments described herein thus provide a way for grey water to flow by gravity (which may be via a flexible hose connection or via a rigid shower drain pipe) into an intermediate holding device below the passenger floor. From there, the fluid will flow into one of two transfer tubes in the system. Flush valves are provided that act as gates to create temporary residence for the fluid in the transfer tubes. The transfer tubes can store varying volumes dependent on system requirements. The emptying of the transfer tubes may be dependent upon a level sensor that detects if/when the transfer tube is getting full and/or may be dependent upon a timer function that causes the valves to open and close in a predetermined sequence. In any event, when one of the transfer tubes on one side is full, the corresponding upper flush valve is caused to close, and a vacuum flush of the water in the transfer tube is initiated through a lower flush valve. At this point, an upper flush valve on the transfer tube on the opposite side may open (in some instances, it may open simultaneously with the lower flush valve), such that the grey water will then begin to fill the opposite transfer tube. The transfer tubes lead to trunk lines that deliver waste to the main on-board waste tanks.

DETAILED DESCRIPTION

Embodiments of the present disclosure provide a flow control unit or system for controlling liquid flow into a vacuum waste system. The flow control unit can generally be provided with a series of valves that direct liquid flow. The valves open and close in an appropriate sequence in order to hold incoming liquid in transfer tubes, and then to cause the liquid to be routed to one or more vacuum waste tanks. For example, the incoming liquid may be spent (or grey) water from a shower, which includes soap and/or other detergents or wastes. Upon entering the shower drain, the grey water may be held in an intermediate transfer tube. The intermediate transfer tube provides an intermediate holding location for the grey water and a buffer from the vacuum waste system. Once the intermediate transfer tube is near its capacity and/or once the valving system is otherwise activated, the grey water is then delivered to an on-board waste tank via cooperation between the intermediate tube, transfer tubes, trunk lines, and a valve sequence.

The embodiments described herein were generally designed to provide a mechanism for introducing high flow rates of liquids into a vacuum waste system. They were also designed to balance waste loads in aircraft with bilaterally symmetrical waste tanks. Although the embodiments described herein are relevant for use with all passenger transport vehicles that have a vacuum waste system, the embodiments will be described with respect to aircraft for the sake of convenience.

Figure 1:
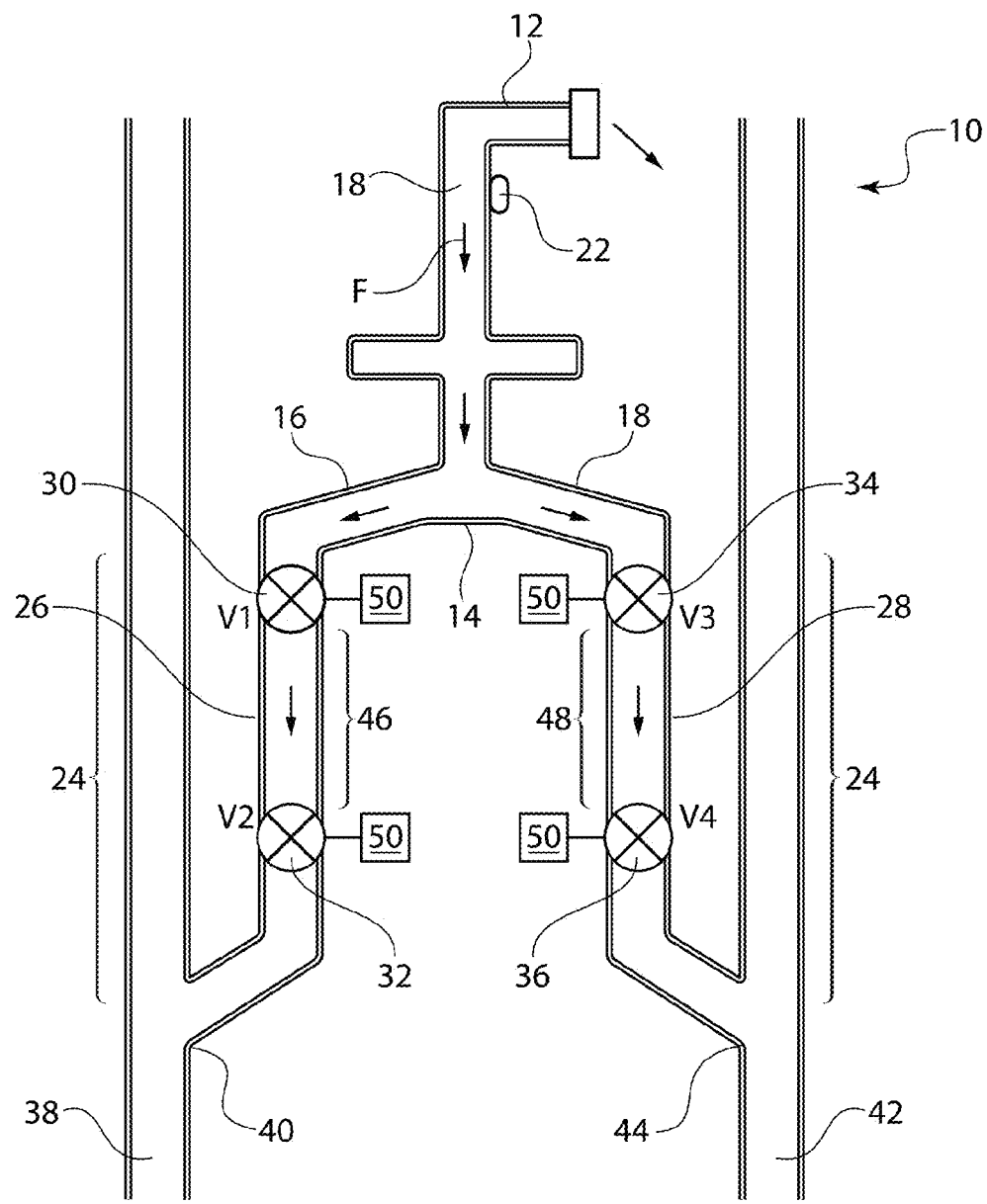
FIG. 1 shows a schematic view of a flow control unit according to one embodiment of the disclosure.

Referring now more particularly to FIG. 1, there is shown a schematic embodiment of water flow through one embodiment of a flow control unit 10. The flow control unit has a liquid intake portion 12. Liquid intake portion 12 may be a shower drain, a sink drain, or some other liquid inflow portion (typically for spent grey water). The initial flow of the incoming water is generally via gravity feed. An intermediate transfer tube 14 is then provided to house the incoming liquid. In the embodiment shown in FIG. 1, the intermediate transfer tube 14 may be provided with two branches—a left branch 16 and a right branch 18. In the embodiment shown in FIGS. 2-4, the intermediate transfer tube 14 may be a generally straight tube that extends with portions on either side of an incoming water line 18.

The intermediate transfer tube 14 may be any appropriate dimension that functions to direct an amount of water prior to its draining into the rest of the flow control unit. For example, the intermediate transfer tube 14 may be designed to hold from a few ounces up to a gallon or more of liquid, or any other desired volume. The intermediate transfer tube 14 directs the water to transfer tubes 26, 28, which provide a buffer for directing water before it is delivered to the main waste tank through the trunk lines. Its dimensions may be optimized based on space, such that a larger diameter may be used for a shorter tube or a smaller diameter may be used for a longer tube. It should also be understood that although a tube embodiment is shown, the intermediate transfer tube 14 may be provided as a tank having any desired dimension or shape. The intermediate transfer tube 14 functions to buffer and guide a portion of the liquid to be directed, prior to delivery of the liquid to left and right transfer tubes. Its purpose is to manage water as it is delivered and to provide an offset point as water is being directed to either the left or right side.

Once the flow control unit is activated to begin, one or both of the upper valves of a valving system 24 open to create a vacuum in the flow control unit 10 to cause movement of the water being held in the intermediate transfer tube 14 and/or transfer tube 26 and/or 28. Each valve of the system may have a dedicated controller 50 that causes the part of the valving system 24 to activate. The controller 50 may be activated based on a timer function that controls valve positions. For example, the timer may be activated by a switch 22 located at the user interface of the water generating unit. In one embodiment, the switch 22 may be a shower switch, such that once the shower is activated, the system will begin activation of the valving system 24. In another embodiment, one or more controllers 50 may activate the system based on input from a water level sensor that indicates to the valving system 24 when the valves should pulse open and closed. It should be understood that other activation systems are possible and within the scope of this disclosure.

In the schematic of FIG. 1, the intermediate transfer tube 14 leads to a left transfer tube 26 and a right transfer tube 28. The left transfer tube 26 is fluidly separated from the intermediate transfer tube 14 by an upper left valve 30 (also referenced in FIG. 1 as V1). The use of the term "upper" is used in reference to the flow F of fluid (shown by arrows), with the upper left valve 30 being higher in the flow stream F (upstream or otherwise first to contact the incoming water) than lower valves. Further along the water flow line F is a lower left valve 32 (V2).

On the opposite side of the flow control unit 10, the right transfer tube 28 is fluidly separated from the intermediate transfer tube 14 by an upper right valve 34 (V3). Further along the water flow line F is a lower right valve 36 (V4). These valves 30, 32, 34, 36 make up a primary portion of the valving system 24.

The transfer tubes may be configured to hold any appropriate volume of liquid. In one embodiment, the transfer tubes are configured to hold from about one to about three gallons of grey water. However, they may be designed to hold a lower volume or a higher volume. The volume capacity and the length of the tubes may be varied depending upon the size of the vehicle being serviced. The dimensions of the transfer tubes may be optimized based on space, such that a larger diameter may be used for a shorter tube or a smaller diameter may be used for a longer tube. It should also be understood that although a tube embodiment is shown, the transfer tubes 26, 28 may be provided as tanks having any desired dimension or shape. The transfer tubes function to buffer and guide a portion of the liquid to be directed to the main waste tank via the trunk lines.

The left and right transfer tubes 26, 28 are fluidly connected to main trunk lines of the vacuum waste system. As shown in the Figures, the left transfer tube 26 is fluidly connected to the vacuum waste system left trunk line 38 at a left interface 40. Passage of the fluid past the interface 40 is controlled by the lower left valve 32. The right transfer tube 28 is fluidly connected to the vacuum waste system right trunk line 42 at a right interface 44. Passage of the fluid past the interface 44 is controlled by the lower right valve 36.

Vacuum system trunk lines 38, 42 run along both sides of the vehicle and provide a conduit for flushing toilet/sewage waste to the main waste tank (not shown). The main waste tank creates a vacuum to pull the waste along the trunk lines 38, 42. The trunk lines 38, 42 are shown in the figures as running generally parallel to the transfer tubes 26, 28, but other configurations may be possible. The interface connections 40, 44 may be near the liquid intake portion 12 so that the system is compact, or the connections may be much further downstream, such that longer transfer tubes 26, 28 are provided.

Figure 2:
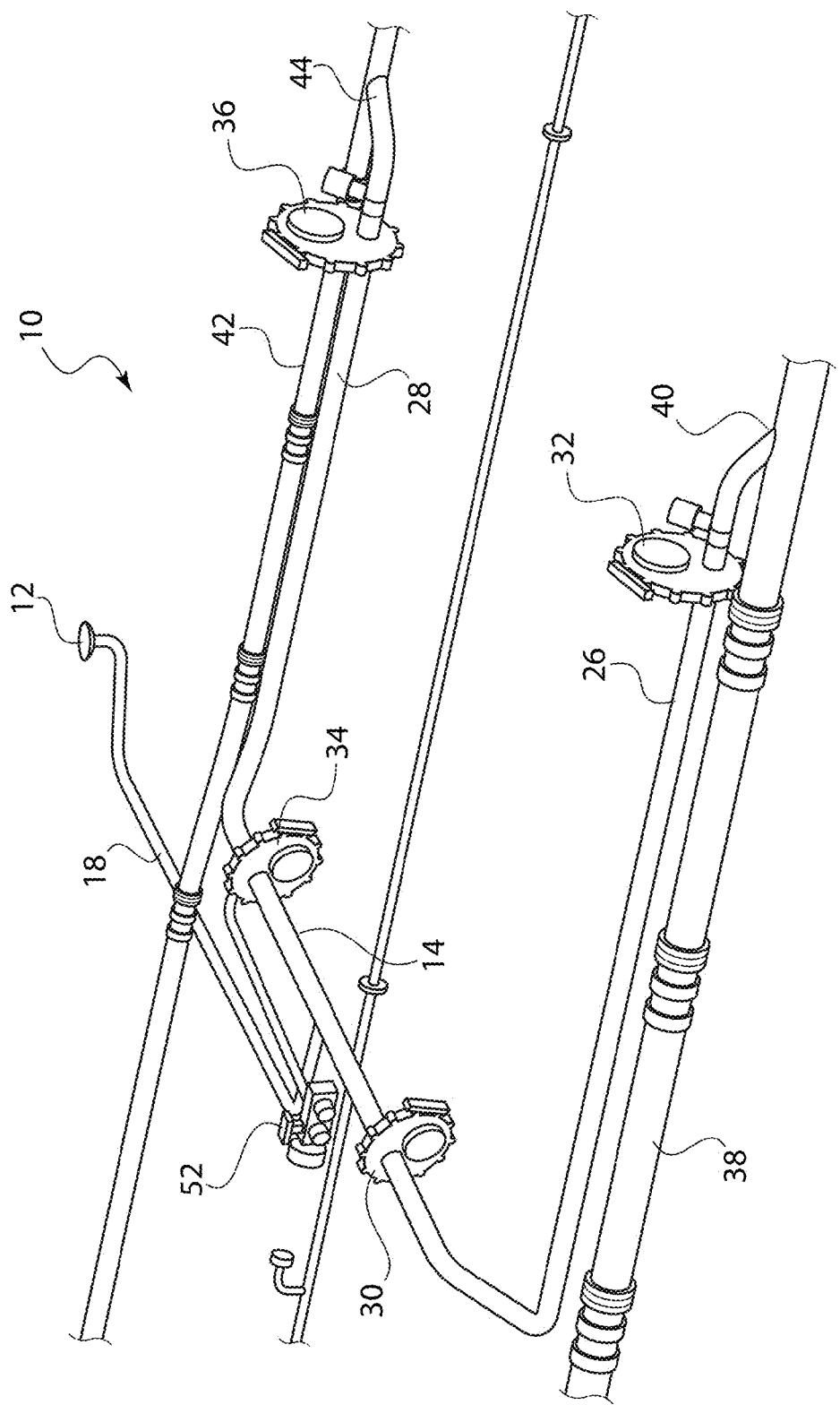
FIG. 2 shows a side perspective view of a flow control unit installed below an aircraft floor.
Figure 3:
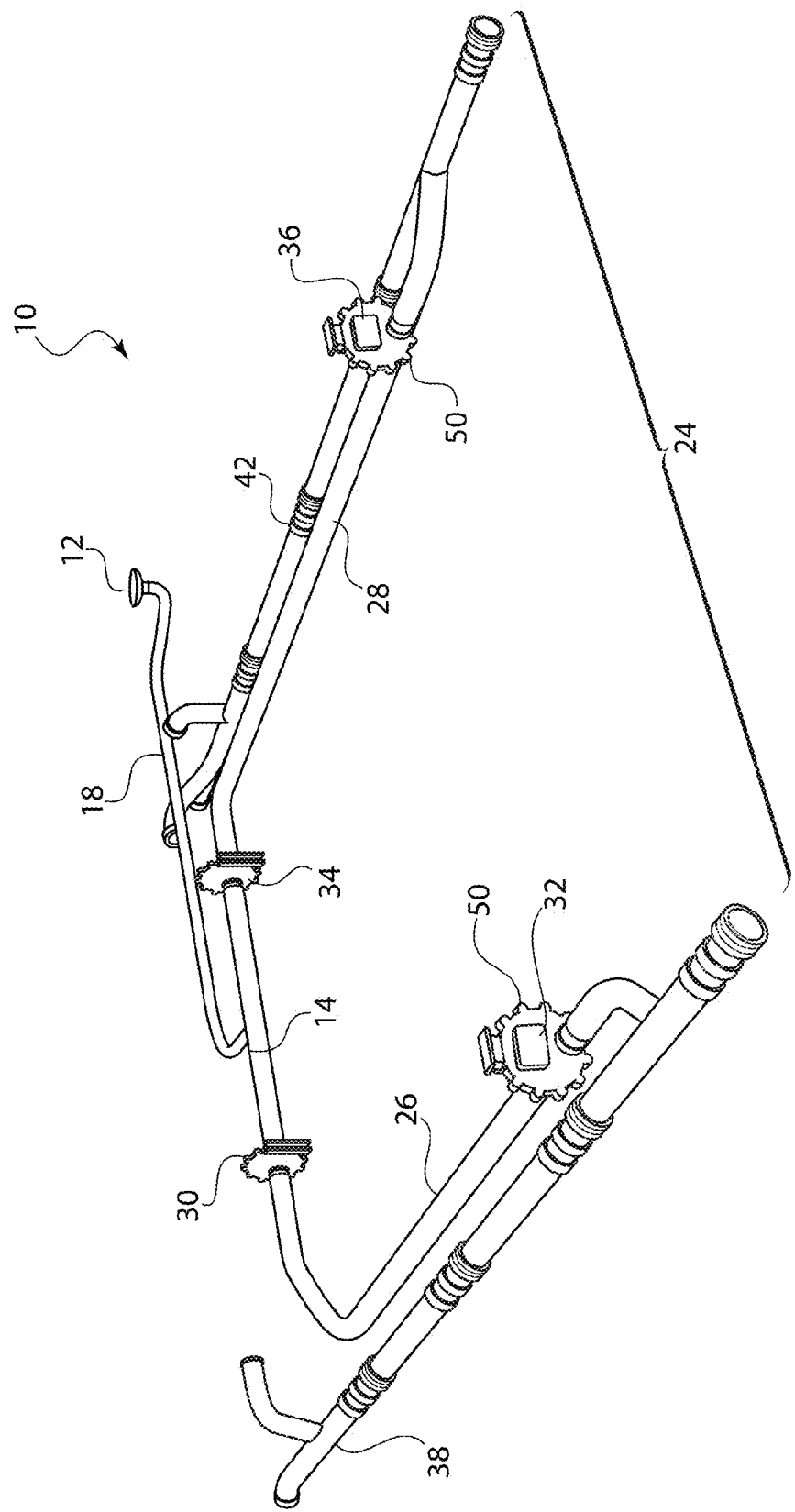
FIG. 3 shows a side perspective view a flow control unit.
Figure 4:
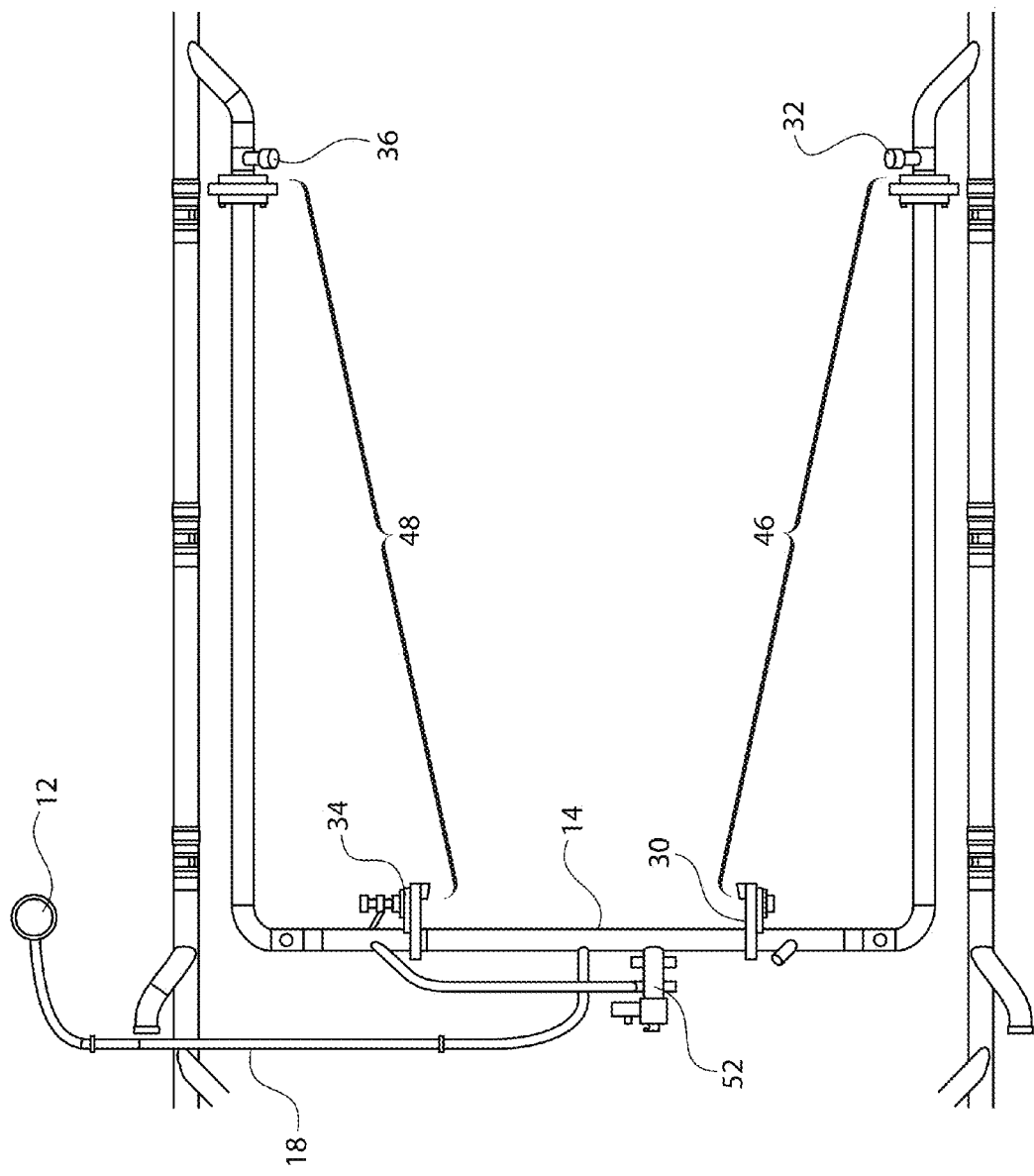
FIG. 4 shows a top plan view of the flow control unit.

FIGS. 2 and 3 shows side perspective views, and FIG. 4 shows a top plan view, of one commercial embodiment that may be installed on board an aircraft. FIGS. 2 and 4 also show an optional vent valve 52 in place. In some embodiments, a vent line may be connected to each transfer tube 26 and 28. This can allow air to flow when the grey water is pulled/vacuumed into the main trunk lines 38, 42. If desired, a muffler may be provided at this or another location for noise reduction. The vent valve and/or a muffler may be attached to the vent lines.

This flow control unit 10 is designed for use with a shower system or other continuous water generating system. These figures show the flow control unit 10 components as they would be mounted beneath the aircraft floor. The incoming water from a shower drain, which forms the liquid intake portion 12, is delivered to an intermediate transfer tube 14. (Although shown and described as a tube for the sake of convenience, it should be understood that this feature may be a tank or any other shaped water holding component.)

The water being directed through the intermediate transfer tube 14 will need to be flushed to the main waste tank, via the left and right lower valves 32, 36. This is accomplished via coordinated opening and closing of the valving system 24, which includes the upper left valve 30, the lower left valve 32, the upper right valve 34, the lower right valve 36. The general goal is to move the water being held, but to coordinate opening and closing of the valves so that a loud suction sound is not heard by the shower user. Maintaining the upper valves 30, 34 in a closed position when the vacuum is applied can prevent such sound. This also prevents the user from being exposed to vacuum, which may be a safety issue and also prevents both vacuum lines from being open to each other. The water being flushed is moved from the transfer tubes 26, 28 to the trunk lines 38, 42, which direct the water to the main waste tank. Passage of the fluid out of the transfer tubes, past the interfaces 40, 44, is controlled by the lower valves 32, 36 (V2 and V4).

There can be a number of benefits to providing redundant systems on the left and right hand sides of the unit 10. First, if positioned on board an aircraft, the flow of water to the main waste tank can be divided along left and right sides of the aircraft. There may be provided left and right side main waste tanks. In another embodiment, there may be a central waste tank. Either option is possible and can be used in connection with the features described herein. Providing a division of the traveling water along left and right sides can help balance the aircraft, rather than providing a large weight burden running alongside only a single side of the aircraft. Although this may not be a concern on a larger aircraft, if the system is used on a 787 VIP jet, or other smaller aircraft that provides showers and other water draining amenities, this can be a distinct advantage. Additionally, if one system of valves were to fail, the other side could be configured to handle the incoming water load on its own.

The flow F water along the left side of the unit will now be described, and it should be understood that a similar flow would occur along the right hand side of the unit once the valving system 24 switches sides. It should also be understood that liquid may be caused to travel to the right side of the system initially. When a signal is given to cause water to leave the intermediate transfer tube 14 and travel to the left transfer tube 26, upper left valve 30 is opened. The lower left valve 32 (as well as both valves 34, 36 on the right side) remains closed. This is the configuration shown in the schematic of FIG. 1. Water from the intermediate transfer tube 14 fills the portion 46 of the left transfer tube 26 that is between the upper and lower valves 30, 32. This may happen via gravity feed. However, other options are possible and pumps may be provided if necessary. When this portion 46 is full (which may be indicated by a level sensor or when an appropriate time has lapsed; standard or modified control systems may be used), it should be emptied. Emptying of the transfer tube 26 may be accomplished by varying valving schemes.

In one embodiment, to empty the left transfer tube, the upper left valve 30 closes and the upper right valve 34 opens, in order to give incoming water from the intermediate transfer tube 14 a place to collect. Fluid may flow from the intermediate transfer tube 14 into a portion 48 between the valves (34, 36) of the right transfer tube 28. Next, the lower left valve 32 may open. This subjects the left transfer tube 26 to vacuum from the vacuum system. But by closing the upper valve 30 prior to opening of the lower valve 32, the vacuum (and associated noise) from the vacuum system is not transmitted through the unit 10 and up to the liquid intake portion 12. The left transfer tube 26 is now fluidly connected to the vacuum waste system left trunk line 38. Opening of lower left valve 32 allows application of a vacuum to the fluid, which forces liquid in the portion 46 to be forcefully drawn out of the portion 46 and into the trunk line 38. An optional pressure sensor may be provided to verify when vacuum is present in order to ensure that other valves are closed when the lower valve is opened.

In another embodiment, both portions of the transfer tubes may be filled at the same time. Then the upper valves may be opened at the same time, and once closed, the lower valves may then open in concert so that both portions 46, 48 are emptied together. The feasibility of this embodiment may depend upon the size of the intermediate transfer tube 14 and its holding capacity. However, it is also possible (and currently envisioned) that the left and right transfer tubes are emptied on alternating cycles. In either embodiment, there may be a specified sequence that the valving system 24 follows when the switch 22 is on. The valves may be operated based on a level sensor; based on timed operation; based on a system that allows communication between the valves (e.g., the upper valve may communicate with lower valve to ensure that the lower valve is not open at the same time as the upper valve); or based on any other appropriate parameters. For example, one or more controllers may be provided that communicate for synchronization of the valves, in the event of valve failure, for re-set timing, or any combination thereof. There could be a scenario provided for failure cases in which controller communication or sensor feedback may need to increase.

In one embodiment, each of the four valves may be integrated with its own dedicated controller 50. This allows grey water from a shower (or foot wash or other water generating source) to be distributed to the left and right side main waste tanks equally on a smaller aircraft. In a specific embodiment, each flow control valve incorporates internal hardware that is similar to (if not identical to) existing flush valve assemblies on board the aircraft, but with updated software to control valve open and close functions for the system. The controller may incorporate a timer function to control motor valve position. The timer may be present on all four valves, or it may be a single timer that has a coordinated sequence that triggers and controls all four valves in concert. The timer may alternatively be provided as a left and right side timer, or an upper and lower timer. The timer may be triggered simultaneously by activation of a switch, such as a shower switch, located at the user interface in the shower (or other water generating unit). Activation or sensing of water flow may activate the opening and closing sequence of the valves.

The timer calculation may be based on the transfer tube lengths, the drain rate, and/or other considerations. For example, if a system needs to evacuate grey water at a rate of 4 gallons per minute (GPM) with a maximum usage time of 15 minutes, the timer may be programmed for optimal valve opening sequence to manage water flow. For example, it grey water fills the left transfer tube 26 first, as shown in FIG. 1, the upper left valve 30 may be scheduled to be the first valve to open, while the remaining valves remain closed. When the upper left valve 30 is closed, the upper right valve 34 may then open to allow water to also fill the right transfer tube 28. When one (or both) of the transfer tubes 26, 28 reaches a near full grey water level, a vacuum generator request may be sent out by the lower (or downstream) valve controller for that transfer tube to the respective vacuum generator. (If the system in installed on an aircraft, and if in flight, the vacuum may be generated by a natural differential pressure.) The left and/or right lower valve may then open to evacuate grey water to the respective main waste tank by delivering water to the trunk lines using the vacuum generated.

In one embodiment, after the upper left valve closes, the opposite transfer tube 28 in the system begins to fill via valve sequencing in the timer software. The lower valves may request vacuum if on ground or at low altitude, and may open if its corresponding upper valve is closed. In this manner, the system may alternate grey water evacuation between the left and right transfer tubes 26, 28 to maintain equal distribution to both the left and right waste tanks. Vacuum generator requests for the upper valves should generally be disabled (or not provided), because the upper valves will generally not pull vacuum. The four valves interface with the aircraft power system for power and communication with existing aircraft interfaces.

Figure 5:
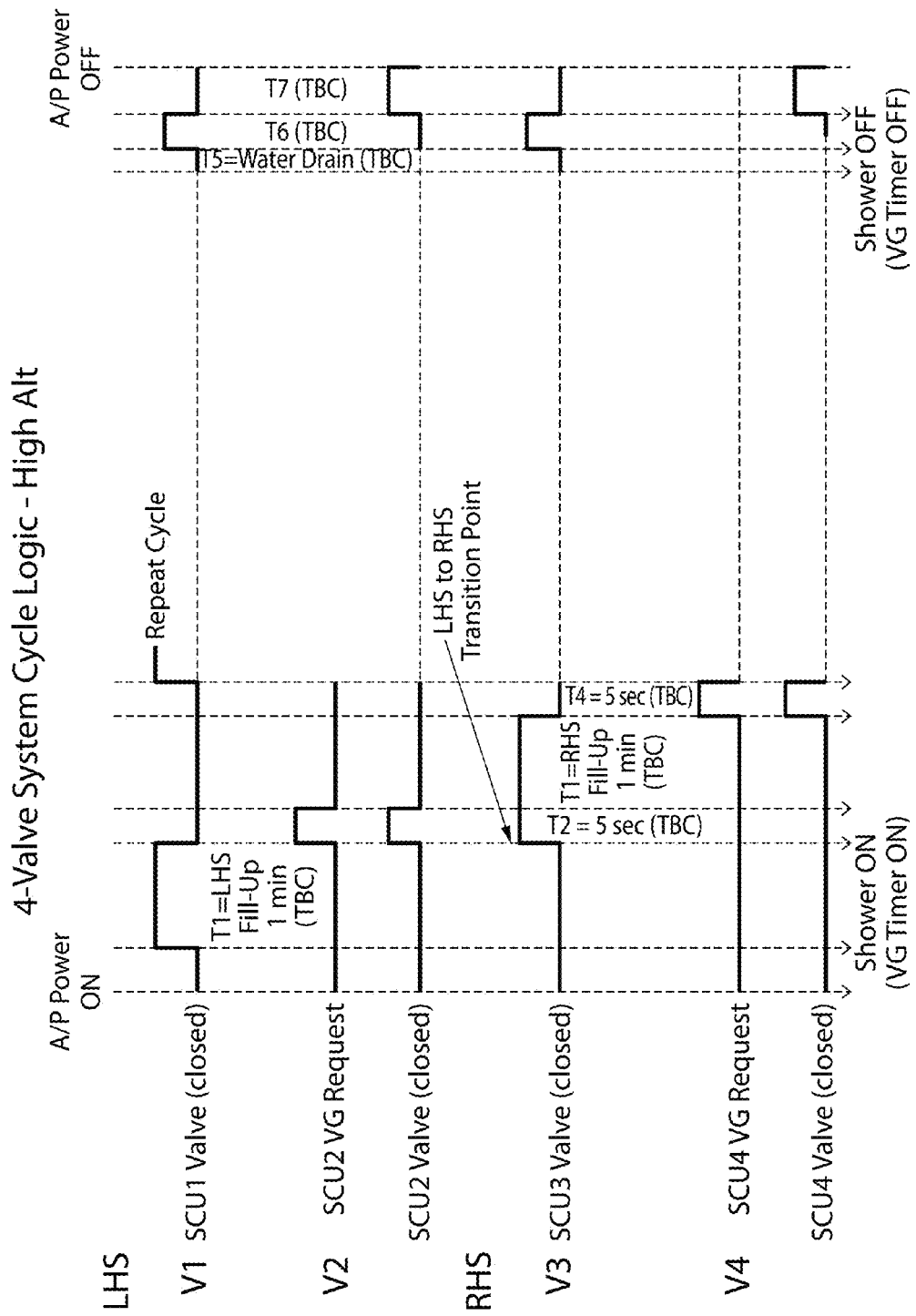
FIG. 5 shows one embodiment of a logic sequence for a flow control unit at high altitude.
Figure 6:
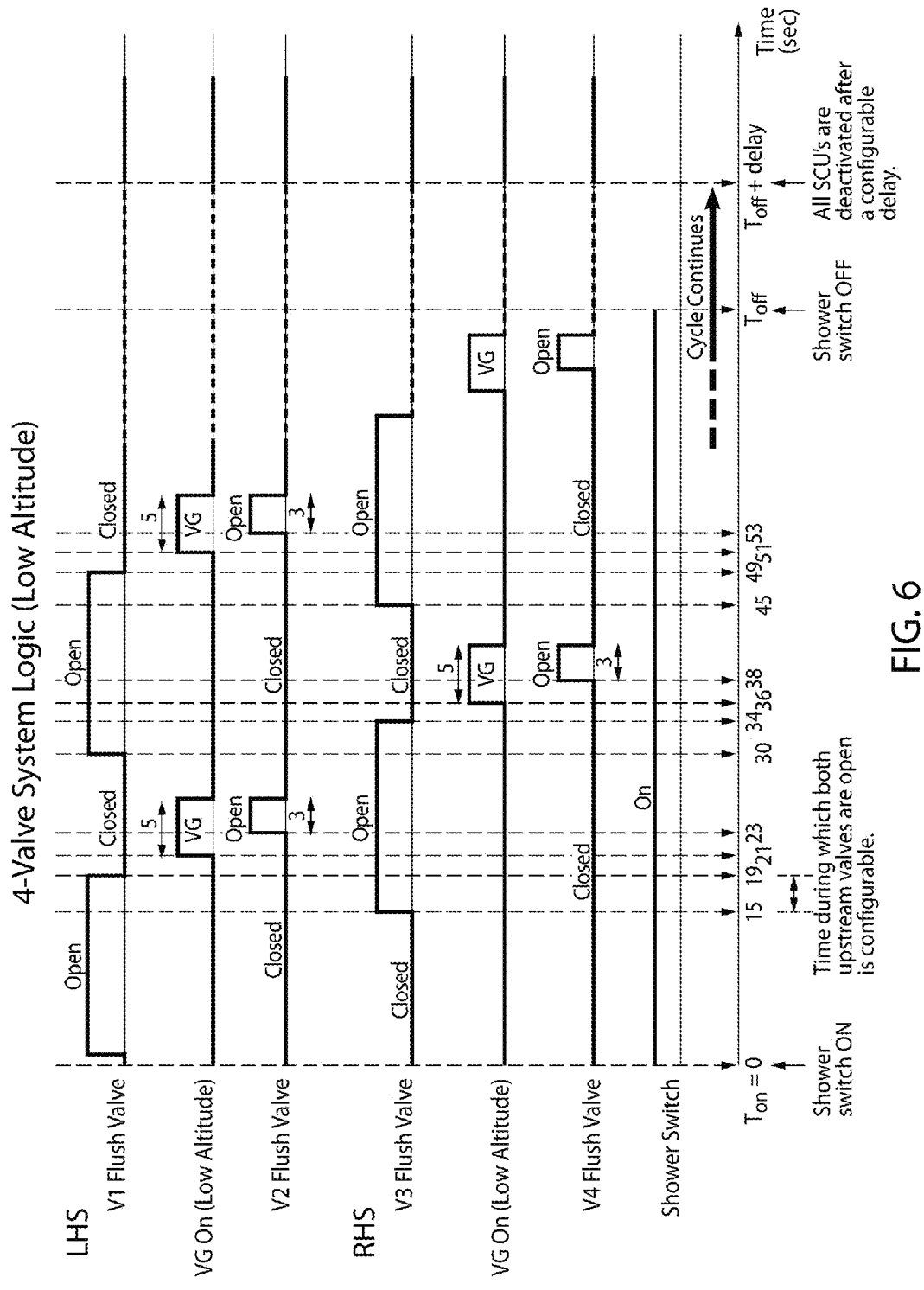
FIG. 6 shows an alternate embodiment of a logic sequence for a flow control unit at a lower altitude.

In a specific embodiment, the valves may be powered with 28 VDC power supplies. The valves may be capable of being commanded through airplane CAN interfaces. The interfaces may be configured (software/hardware/wiring standpoint), to be able to sequence all four valve open/close functions in any order desired. One example of valve control logic that may be used is outlined in FIGS. 5 and 6 and described below. For the low altitude option shown in FIG. 6, there may be a delay with the lower valve opening after a vacuum generator request has been sent when the aircraft is at low altitudes. This allows time for vacuum to generate to its high level.

Figure 7:
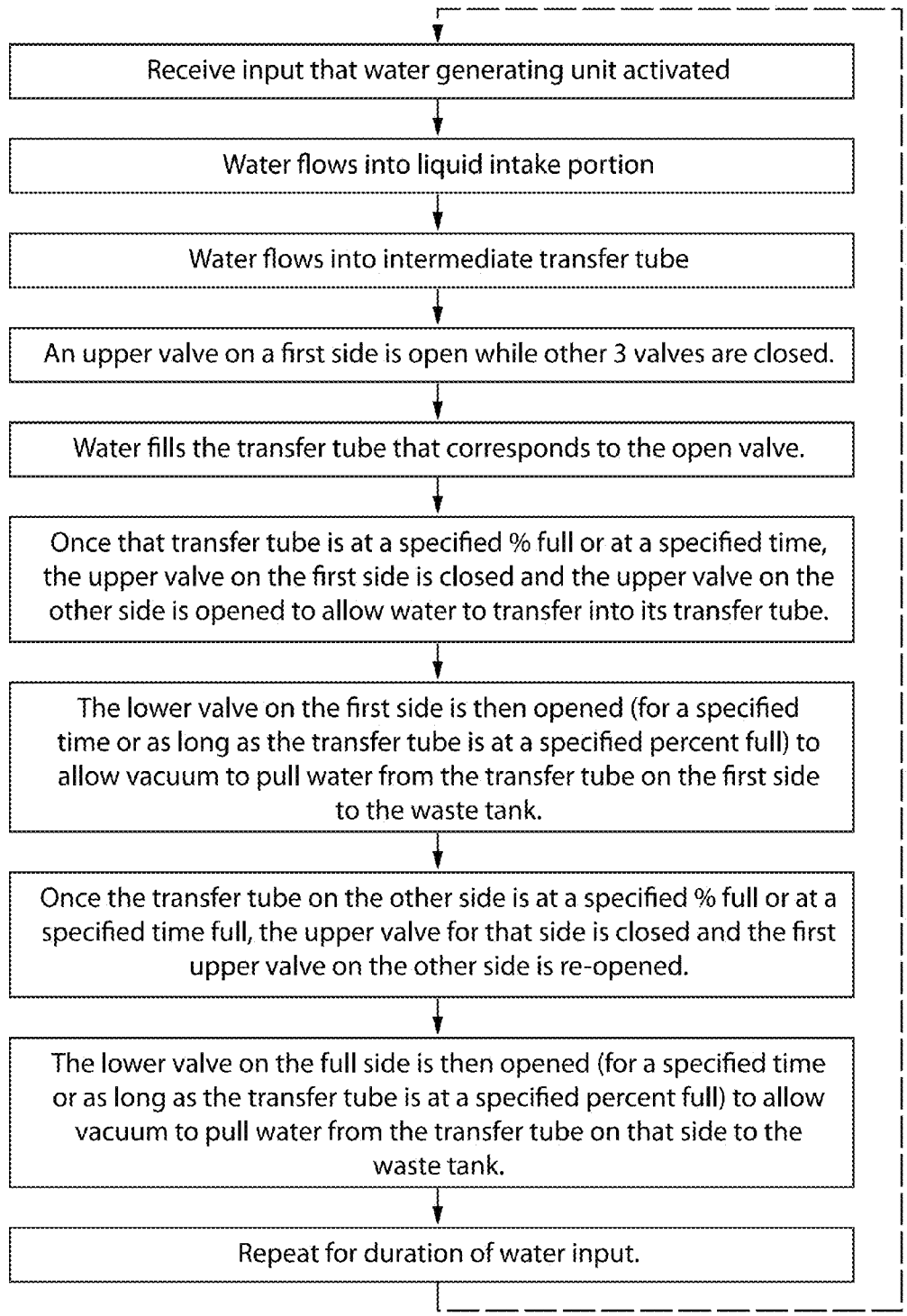
FIG. 7 shows a flow chart detailing one embodiment of water flow through a flow control unit.

FIG. 7 outlines a process for activating valves and causing the desired water flow. Although the features have been described with the water flowing in to the left hand side of the system first, it should be understood that the protocol may be designed to cause water to start to flow into the right hand side of the system instead.

It should be understood that throughout this description, the terms "left" and "right" are used for convenience and ease of review only. The primary concept is that there are two transfer tubes and two sets up upper and lower valves. It may be possible, for example, for the system to use upper and lower features, rather than left and right.

Once the water generating unit is activated (in the examples provided herein, a shower), a switch indicating system power may relay information to the flow control unit 10 that flow transfer will be needed. The upper first valve (referenced as V1 in FIGS. 5 and 6) may be commanded to the open position, while the other valves remain closed. When the water begins to flow into the liquid intake portion, water will first enter the intermediate transfer tube. Water then flows into the first transfer tube, through the open upper first valve V1. A timer system may be programmed so that at a certain time, the upper first valve V1 will close. This may be, for example, at 10 or 15 or 20 seconds, or at any other predetermined time. Alternatively, a level sensor may be provided to indicate that the first transfer tube is at a certain percentage full, for example, at 60%, 70%, or 80% full or any other predetermined level.

When the upper first valve V1 closes, the lower first valve (referenced as V2 in FIGS. 5 and 6) opens. The vacuum created by either a vacuum generator or pressure differential of the main waste system causes the water downstream of the first upper valve V1 to be suctioned into the vacuum waste system first trunk line via the lower valve V2, which leads to the first waste tank. Once this removal has completed, the first lower valve V2 may be closed.

Once the second transfer tube is at a specified percentage full or once the timer sequence indicates, the upper second valve (referenced as V3 in FIGS. 5 and 6) is closed. Now that the water has been transferred from the first transfer tube, the upper first valve V1 may open again for water to re-fill that side of the system. Then a flush sequence for the second transfer tube occurs. The lower second valve (referenced as V4 in FIGS. 5 and 6) sends a vacuum request. The vacuum created by either a vacuum generator or pressure differential of the main waste system when the lower valve V4 is opened causes the water downstream of the second upper valve V3 to be suctioned into the vacuum waste system second trunk line via the lower valve V4, which leads to the second waste tank. Once this removal has completed, the second lower valve V4 may be closed. The process may repeat as long as the water generating unit is activated, which can be indicated to the system via a switch "on" event. The specific way that the valving system provides communication between the valves depends upon what type of aircraft the system is installed in. For example, if the system is installed in a 787, it may use the CANBUS or CCS (common core system). It should be understood that other communication systems are possible and considered within the scope of this disclosure.

Some benefits of the system described are that the vacuum system may be used to receive grey water in high flow applications, such as a shower or other continuous water generating system. A further benefit is that the system helps balance grey water load between left and right waste tanks. The inherent redundancy due to connections based on two waste lines can also be beneficial in the event of a back-up or failure of a portion of a system on one side.

Changes and modifications, additions and deletions may be made to the structures and methods recited above and shown in the drawings without departing from the scope or spirit of the invention and the following claims.

What is claimed is:

1. A flow control unit for controlling liquid flow in a vacuum waste system, comprising:
   (a) an incoming liquid line;
   (b) an intermediate transfer tube;
   (c) a left transfer tube comprising an upper left flush valve and a lower left flush valve; and
   (d) a right transfer tube comprising an upper right flush valve and a lower right flush valve,
   wherein the upper left and upper right valves are configured to control liquid flow between the intermediate transfer tube and the left and right transfer tubes, and wherein the left and right lower valves are configured to control liquid flow between the left and right transfer tubes and one or more waste tanks of the vacuum waste system.

2. The flow control unit of claim 1, further comprising:
   (e) a first interface between the left transfer tube and the vacuum waste system; and
   (f) a second interface between the right transfer tube and the vacuum waste system.

3. The flow control unit of claim 1, wherein the liquid flow comprises grey water from a shower on-board a passenger transport vehicle.

4. The flow control unit of claim 1, wherein the incoming liquid line is fluidly connected to a liquid intake portion.

5. The flow control unit of claim 4, wherein the liquid intake portion comprises a shower drain.

6. The flow control unit of claim 1, wherein the intermediate transfer tube receives fluid flow from the incoming liquid line and is positioned upstream of the left and right transfer tubes.

7. The flow control unit of claim 1, wherein liquid flows into the left transfer tube when the upper left flush valve is open.

8. The flow control unit of claim 1, wherein liquid flows into the right transfer tube when the upper right flush valve is open.

9. The flow control unit of claim 1, wherein liquid flows into the vacuum waste system when one or both of the lower left flush valve or the lower right flush valve is open.

10. The flow control unit of claim 1, further comprising a timer for controlling opening and closing of the upper left flush valve, the lower left flush valve, the upper right flush valve, and the lower right flush valve.

11. The flow control unit of claim 1, further comprising a level sensor to control opening and closing of the upper left flush valve, the lower left flush valve, the upper right flush valve, and the lower right flush valve.

12. The flow control unit of claim 1, wherein the vacuum system comprises a left trunk line and a right trunk line, and wherein the left transfer tube joins the left trunk line at a first interface, and wherein the right transfer tube joins the right trunk line at a second interface.

13. The flow control unit of claim 1, wherein the flow control unit is installed on board a passenger transport aircraft.

14. The flow control unit of claim 13, wherein the aircraft comprises two waste tanks for receiving downstream liquid flow, one waste tank on either side of the aircraft.

15. The flow control unit of claim 1, wherein each of the valves comprises a valve controller.

16. A flow control unit for controlling liquid flow in a vacuum waste system, comprising:
   (a) a liquid intake portion;
   (b) the liquid intake portion in fluid communication with an intermediate transfer tube;
   (c) a left transfer tube fluidly separated from the intermediate transfer tube via an upper left flush valve, and further comprising a lower left flush valve;
   (d) a right transfer tube fluidly separated from the intermediate transfer tube via an upper right flush valve, and further comprising a lower right flush valve;
   (e) a left interface between the left transfer tube and the vacuum waste system, wherein liquid in the left transfer tube flows into a left vacuum waste system trunk line upon application of vacuum; and
   (f) a right interface between the right transfer tube and the vacuum waste system, wherein liquid in the right transfer tube flows into a right vacuum waste system trunk line upon application of vacuum.

17. A method for controlling a valve system sequence for a flow control unit comprising:
   (a) receiving input that a water generating unit activated;
   (b) receiving water flow into a liquid intake portion;
   (c) directing the water flow into an intermediate transfer tube;
   (d) causing an upper valve on a first side of the flow control unit to be open while two lower valves are closed;
   (e) after water fills a transfer tube that corresponds to the open upper valve and once the transfer tube is at a specified percentage full or at a specified time, closing the upper valve on the first side and opening an upper valve on a second side to allow water to enter a corresponding transfer tube on the second side;
   (f) sending a vacuum request and opening a lower valve on the first side;
   (g) allowing vacuum to pull water from the transfer tube on the first side to a first side waste tank;
   (h) once the transfer tube corresponding to the upper valve on the second side is at a specified percentage full or at a specified time full, closing the upper valve on the second side and reopening the upper valve on the first side;
   (i) opening a lower valve on the second to allow vacuum to pull water from the transfer tube on the second side to a second side waste tank; and
   (j) causing the sequence to repeat for a duration of water input.

18. The method of claim 17, wherein each of the valves is operated by a controller.

19. The method of claim 17, wherein one or more controllers communicate for synchronization of the valves, in the event of valve failure, for re-set timing, or any combination thereof.

* * * * *